United States Patent

Kashiwase

[11] Patent Number: 6,066,059
[45] Date of Patent: *May 23, 2000

[54] CONTINUOUSLY VARIABLE TRANSMISSION SYSTEM

[75] Inventor: Hajime Kashiwase, Tokyo, Japan

[73] Assignee: Fuji Jukogyo Kabushiki Kaisha, Tokyo, Japan

[*] Notice: This patent is subject to a terminal disclaimer.

[21] Appl. No.: 09/116,588

[22] Filed: Jul. 16, 1998

[30] Foreign Application Priority Data

Aug. 12, 1997 [JP] Japan .................................. 9-217869

[51] Int. Cl.$^7$ .................................................. F16H 37/02
[52] U.S. Cl. ................................ 475/66; 475/68; 475/210
[58] Field of Search ........................... 192/3.22, 3.29; 475/59, 66, 68, 210, 35, 36, 47, 52, 207

[56] References Cited

U.S. PATENT DOCUMENTS

| 2,388,849 | 11/1945 | Jandasek | 192/3.22 X |
|---|---|---|---|
| 3,425,295 | 2/1969 | Galaniuk | 475/36 |
| 3,838,611 | 10/1974 | Koivunen | 475/59 |
| 3,893,350 | 7/1975 | Gingras | 475/47 |
| 4,478,323 | 10/1984 | Weissenberger | 192/3.3 |
| 5,295,920 | 3/1994 | Sawasaki et al. | 475/210 |

FOREIGN PATENT DOCUMENTS

| 0864778 | 9/1998 | European Pat. Off. . |
|---|---|---|
| 2273204 | 12/1975 | France . |
| 61-105333 | 5/1986 | Japan . |
| 2033029 | 5/1980 | United Kingdom . |
| 2045368 | 10/1980 | United Kingdom . |

OTHER PUBLICATIONS

Patent Abstracts of Japan, vol. 10, No. 291, Oct. 3, 1986 and Japan 61 105333, May 23, 1986.

Primary Examiner—Sherry L. Estremsky
Attorney, Agent, or Firm—Smith, Gambrell & Russell, LLP; Beveridge, DeGrandi, Weilacher & Young Intellectual Property Group

[57] ABSTRACT

A torque converter, a forward and reverse changeover apparatus including a planetary gear, a reverse brake and a forward clutch, and a lock-up clutch are integrally accommodated in the same torque converter case. Further, the planetary gear, the reverse brake, the forward clutch and the lock-up clutch are arranged on approximately the same plane expanded in the radial direction with respect to a transmission input shaft. Further, a forward clutch piston and a lock-up piston are arranged side by side on the transmission main shaft and a hydraulic chamber for operating the lock-up piston is provided independently from other hydraulic circuits. Thus constituted continuously variable automatic transmission provides a transmission having a short width and a good controllability.

10 Claims, 3 Drawing Sheets

CONTINUOUSLY VARIABLE TRANSMISSION SYSTEM

BACKGROUND OF THE INVENTION

1. Field of the Invention

The present invention relates to an automatic transmission and more particularly to a continuously variable automatic transmission whose overall width is shortened so as to be accommodated in a limited space of an engine room.

2. Prior Arts

In general, a continuously variable automatic transmission used for a motor vehicle comprises a continuously variable transmission which is a main transmission mechanism for controlling vehicle speeds during normal operation, a starting apparatus for controlling power transmission of an engine and transmission during the vehicle starting period, and a forward and reverse changeover apparatus for changing over from forward to reverse running.

The starting apparatus described herein has a function of a clutch for transmitting power from the engine to the transmission smoothly when the vehicle starts to move from a standstill condition.

For example, Japanese Patent Application Laid-open No. Toku-Kai-Shou 61-105333 discloses a continuously variable automatic transmission using a torque converter as a starting apparatus, as shown in FIG. 2.

When the engine starts, the driving force of the engine 10 is transmitted to a pump impeller 2c incorporated in a torque converter 2b through a torque converter case 2a provided in the starting apparatus 2. Then, the pump impeller 2c drives a turbine runner 2d via working fluid and at the same time drives an oil pump 2e.

Further, there is provided with a forward and reverse changeover apparatus 4 between the starting apparatus 2 and a continuously variable transmission 3 and an output shaft 2f connected with the turbine runner 2d is interconnected with a forward clutch 4a.

During forward running, the forward clutch 4a is engaged to transmit the driving force to a primary pulley 3a through the forward clutch 4a.

On the other hand, during reverse running, the forward clutch 4a is released and at the same time a reverse brake 4b is engaged to fix the rotation of a ring gear 4d of the planetary gear 4c. As a result, a sun gear connected with the primary pulley 3a of the continuously variable transmission 3 is rotated reversely at reduced speeds through a planetary pinion connected with a planetary carrier 4f which is connected integrally with a clutch drum 4e of the forward clutch 4a to rotate the primary pulley 3a reversely.

The starting apparatus 2 includes a lock-up clutch 2g for transmitting the engine power at the normal running directly to the output shaft 2f of the torque converter 2 without going through working fluid. The engagement and disengagement of the lock-up clutch 2g is controlled by a lock-up piston 2h.

In the torque converter case 2a, a so-called "apply chamber" 2j is formed on the left side of the lock-up piston 2h and a so-called "release chamber" 2k is formed on the right side thereof. When the working fluid supplied to the release chamber 2k flows into the apply chamber 2j, the lock-up piston 2h is moved to the left by the pressure difference between the release chamber 2k and the apply chamber 2j and the lock-up clutch 2g is disengaged to obtain the coupling condition of the torque converter 2. The working fluid flowing into the apply chamber 2j goes to the drain side after lubricating and cooling the torque converter 2b.

Further, when the working fluid is supplied to the apply chamber 2j, since the working fluid is drained through the release chamber 2k, the pressure difference is generated between the apply chamber 2j and the release chamber 2k, thereby the lock-up piston 2h is moved to the right and the lockup clutch 2g is engaged to obtain the lockup condition.

The engagement and disengagement of the lock-up clutch 2g must be performed swiftly under any running conditions. Further, in general, the lock-up clutch 2g is engaged preferably at low speeds of the engine in order to enhance the power transmission efficiency. However, when the lock-up clutch 2g is engaged at the low speed area of the engine, the fluctuation of the engine speed is likely to increase especially in case of a small speed reduction ratio or the power train and the vehicle body may cause severe vibrations and noises due to a resonance at a particular rotational speed range.

Generally, the power transmission from the lock-up clutch 2g to the output shaft 2f of the torque converter is performed by way of a damper unit 21. In order to absorb fluctuations of the engine rotational speed effectively, it is necessary to increase the damper unit in size. The increase of size incurs not only an increase of manufacturing cost but also an up-sizing of the starting apparatus 2 due to an enlarged damper unit.

There is a known technique in which when the engine torque is short, a part of the driving force is transferred to the torque converter 2b by causing slips in the lockup-clutch 2g to reduce vibrations and noises.

Since the lock-up clutch 2g is operated by the relatively large amount of working fluid which flows between the apply chamber 2j and the release chamber 2k, further since this flow of the working fluid is controlled by changing over hydraulic circuits provided in the apply chamber 2j and the release chamber 2k, respectively, it is difficult to make a fine control with respect to the changeover timing of these hydraulic circuits and the pressure of the working fluid. Therefore, as far as the lock-up clutch 2g is controlled by the hydraulic circuits shared with other hydraulic circuits of the transmission, it is difficult to achieve a stable and accurate slip control in engaging or disengaging the lock-up clutch.

Accordingly, in order to obtain a lock-up control apparatus having a quick response and an accurate operation, it is desirable to incorporate a dedicated independent hydraulic circuit for the slip control. However, generally, providing a dedicated hydraulic circuit is impracticable due to not only the complication of hydraulic circuits but also an increase of the manufacturing cost.

Therefore, in order to achieve a practicable independent hydraulic circuit, the construction of the dedicated hydraulic circuit should be as simple as possible.

FIG. 3 is an example of the case where the engine 10 and the transmission 1 are arranged transversely, in which the overall width Ws of the engine 10 and the transmission 1 must be a size to be able to be accommodated in an engine room 6a.

Recent motor vehicles are equipped with a frame 7 in the engine room 6a for absorbing an impact on both sides of the vehicle in case the vehicle has a collision from the lateral direction. Further, a front tire 8 is arranged outside of the frame 7.

The frame 7 must have a sectional area sufficient to provide rigidity for safety and further the front tire 8 is required to move within as large steering angle as possible in order to obtain a small turning circle radius.

As a result of this, a space for accommodating the engine 10 and the transmission 1 in the engine room 6a tends to become small, therefore the overall width Ws including the engine 10 and the transmission 1 must be shortened as far as possible.

However, in the continuously variable automatic transmission 1 of the prior art, since the starting apparatus 2 and the forward and reverse changeover apparatus 4 are arranged between the engine 10 and the continuously variable transmission 3 according to the order of the transmission of power, it is technically difficult to shorten the width Wt of the continuously variable automatic transmission 1. Several means such as making a pulley ratio of the continuously variable transmission small, reducing the width of a belt wound around both pulleys, making walls thin, making clearances between components small and the like can be considered. However, any of these means may adversely affect the function of the continuously variable automatic transmission 1 or reduce rigidity and strength of the transmission.

As a result of this, it is difficult to incorporate these techniques for shortening the width of the automatic transmission 1 and further one or more other techniques for enhancing the responsibility and control performance of the lock-up control into the automatic transmission.

SUMMARY OF THE INVENTION

In view of the aforementioned disadvantages of the prior arts, it is an object of the present invention to provide a continuously variable automatic transmission system having a short width so as to be able to be accommodated in a narrow engine room and it is another object of the present invention to provide a continuously variable transmission capable of enhancing the responsibility and control performance at the lock-up control, while the width of the transmission is shortened.

To achieve these objects, a first feature of the automatic transmission system according to the present invention is: a torque converter, a forward and reverse changeover apparatus including a planetary gear, a reverse brake and a forward clutch, and a lock-up clutch are integrally accommodated in a torque converter case. A second feature is: the forward and reverse changeover apparatus is disposed between the torque converter and the engine. Further, a third feature is: the forward and reverse changeover apparatus and the lock-up clutch is arranged in the radial direction with respect to a transmission main shaft on approximately the same plane. Further, a fourth feature is: the lock-up clutch is arranged side by side with the forward clutch of the forward and reverse changeover apparatus. Furthermore, a fifth feature is: a lock-up operating chamber for independently operating the lock-up clutch is provided so as to control the lock-up clutch precisely.

DESCRIPTION OF THE DRAWINGS

By way of example only, an embodiment of the present invention will now be described, with reference to the accompanying drawings, in which.

DETAILED DESCRIPTION OF THE INVENTION

Figure 1:
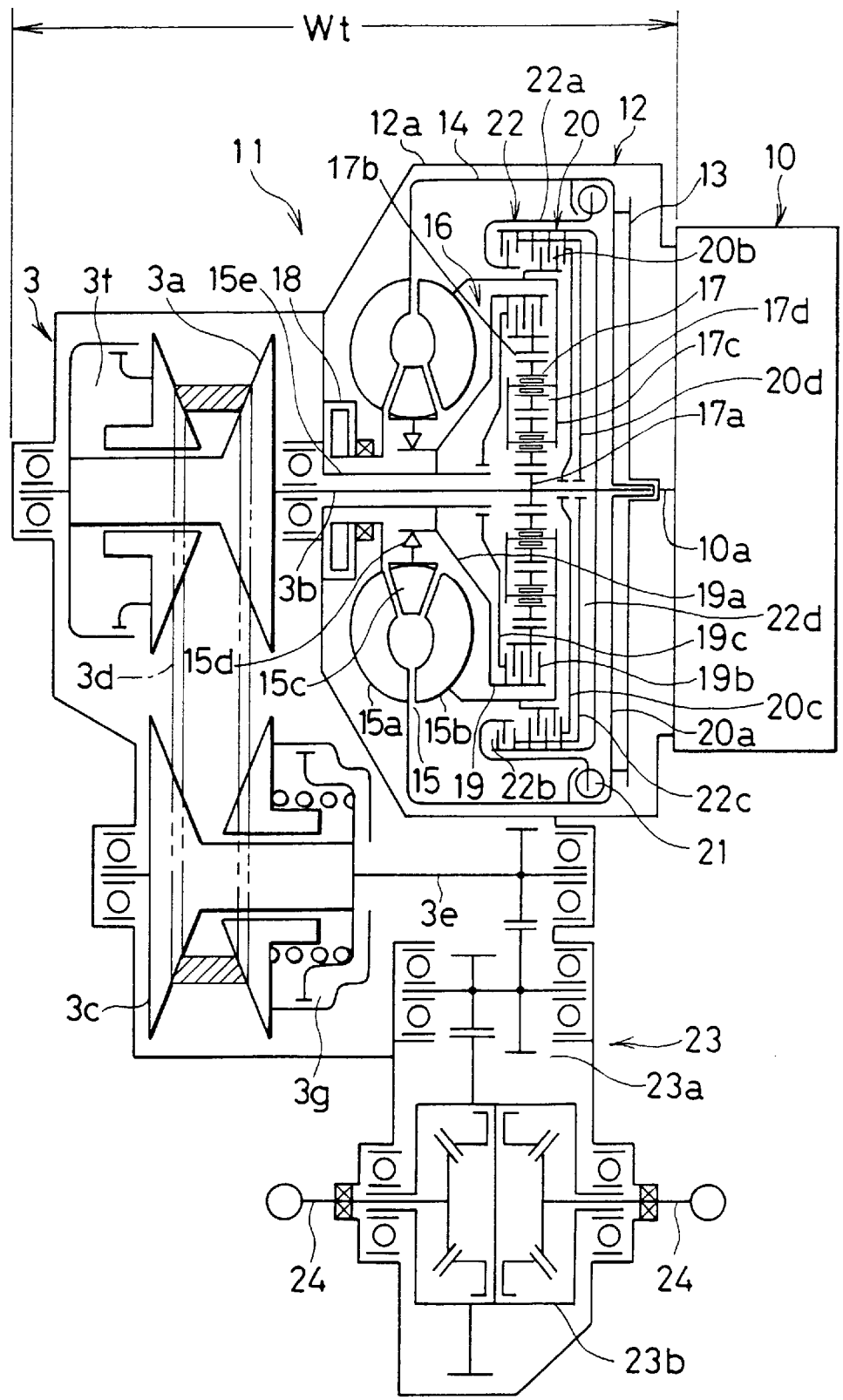
FIG. 1 is a schematic view showing a continuously variable automatic transmission system according to an embodiment of the present invention.
Figure 2:
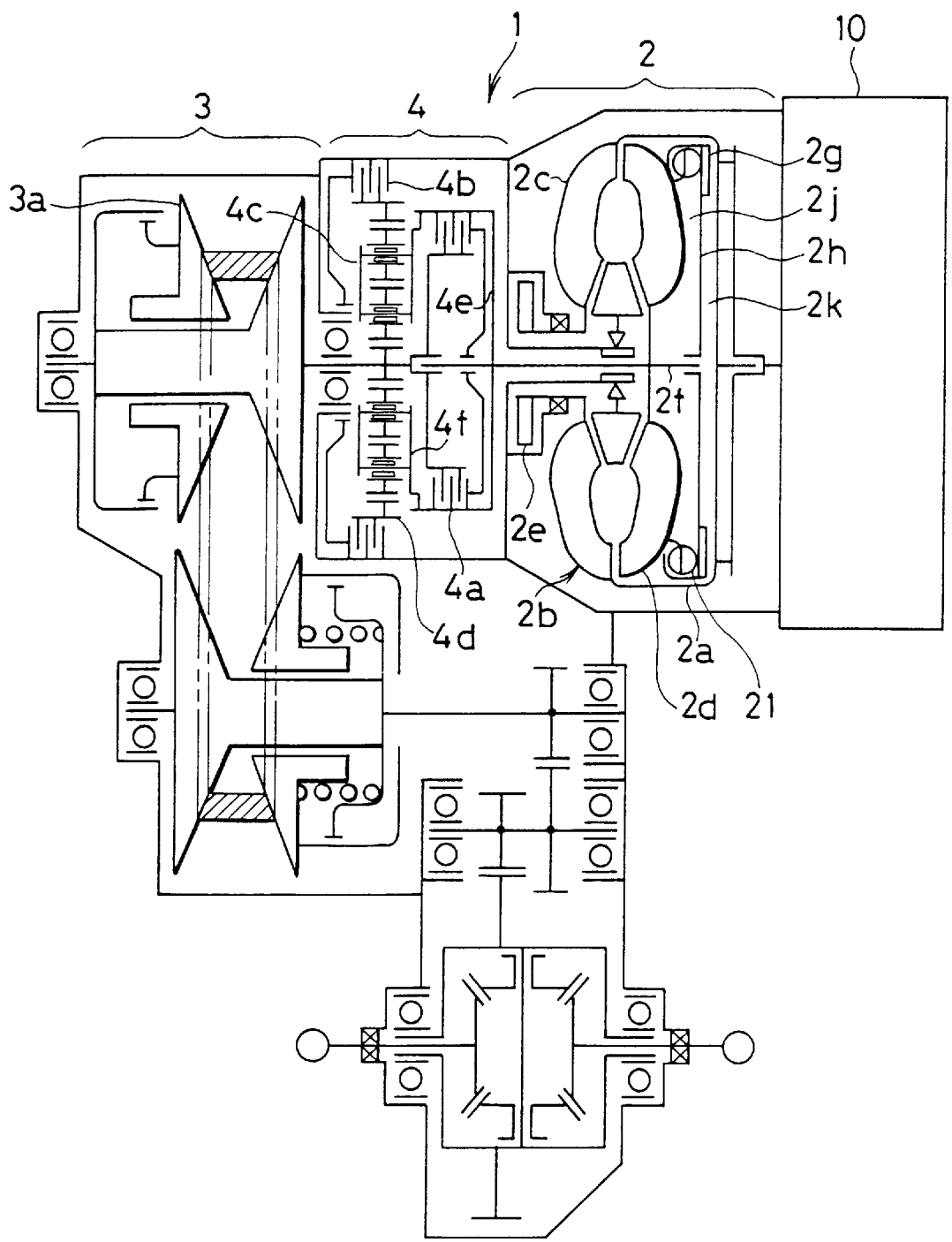
FIG. 2 is a schematic view showing a continuously variable automatic transmission according to a prior art.
Figure 3:
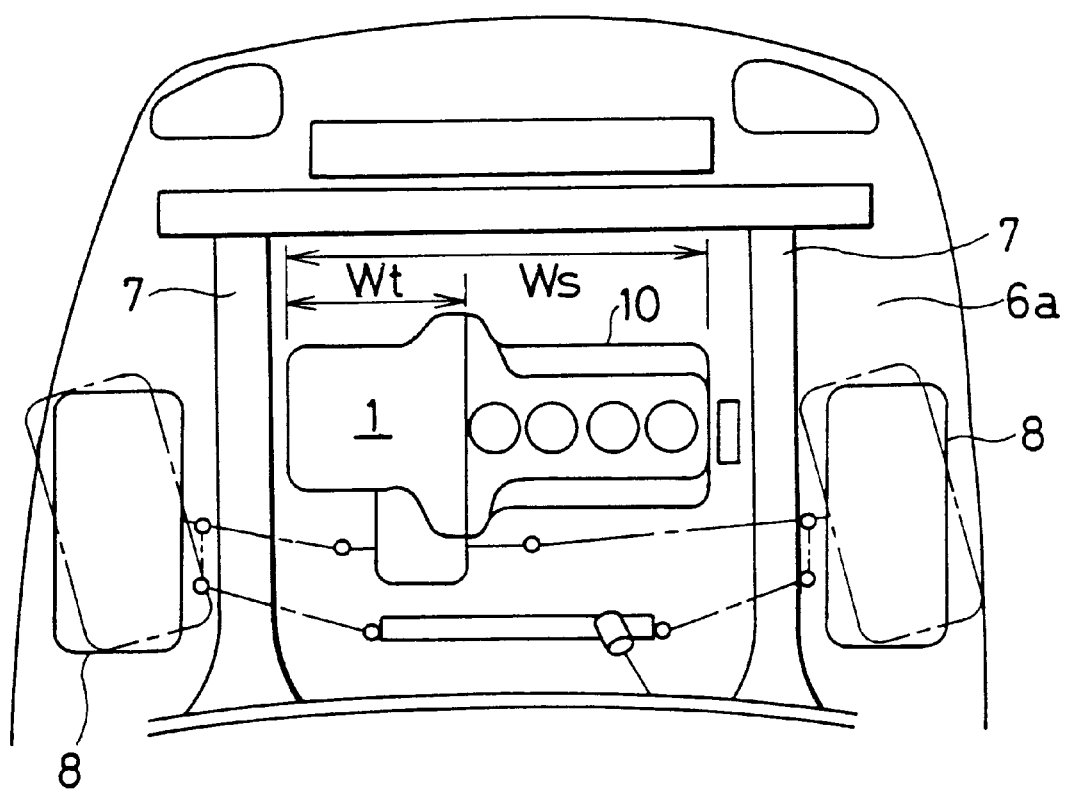
FIG. 3 is a schematic plane view showing a layout of a continuously variable automatic transmission integrally coupled with an engine arranged transversely in an engine room.

Referring now to FIG. 1, reference numeral 11 denotes a continuously variable automatic transmission system incorporating a starting apparatus 12 and a continuously variable transmission 3 therein. Further, the continuously variable automatic transmission system 11 is integrally coupled on the input side thereof with an engine 10.

The starting apparatus 12 has a fixed plate 13 connected with a crank shaft 10a of the engine 10 and further this fixing plate 13 is connected with a pump impeller 15a of a torque converter 15 through a torque converter case 14 for accommodating the torque converter 15. The torque converter case 14 is connected with a case for accommodating the continuously variable transmission 3.

The torque converter 15 comprises the pump impeller 15a, a turbine runner 15b driven by the pump impeller 15a via working fluid and a stator 15c for straightening the stream of the working fluid. The stator 15c is connected through a one-way clutch 15d with a stator shaft 15e which is directly or indirectly fixed to a body case 12a. Numeral 18 denotes an oil pump driven by the pump impeller 15a directly. Further, numeral 16 denotes a forward and reverse changeover apparatus which is accommodated in the torque converter case 14. The forward and reverse changeover apparatus 16 comprises a planetary gear 17, a reverse brake 19 and a forward clutch 20.

The planetary gear 17 is disposed adjacent to the turbine runner 15b of the torque converter 15. The planetary gear 17 includes a sun gear 17a which is connected with or formed integrally with a pulley input shaft 3b extended from a primary pulley 3a. Further, the planetary gear 17 includes a ring gear 17b and a case 19a for mounting the reverse brake 19 is disposed on the outer periphery of the ring gear 17b. The case 19a is connected with the body case 12a through the stator shaft 15e. Further, there is provided with brake plates 19b between the case 19a and the ring gear 17b.

Further, the case 19a is provided between the planetary gear 17 and the turbine runner 15b and its center is fixed to the stator shaft 15e. Further, a brake piston 19c for engaging and disengaging the brake plates 19b is provided between the case 19a and the planetary gear 17 with its center fitted slidably in the axial direction to the stator shaft 15e.

Further, a planetary carrier 17c provided in the planetary gear 17 holds a planetary pinion 17d in such a way that it encloses the brake piston 19c therein. Further, the planetary carrier 17c is connected with the turbine runner 15b in such a way that it overhangs the case 19a from outside.

Further, a forward clutch drum 20a of the forward clutch 20 is provided between the torque converter case 14 and the planetary carrier 17c and its rotation center is connected with the pulley input shaft 3b. Further, a cylinder portion of the forward clutch drum 20a encloses the planetary carrier 17c therein from outside.

There are provided with forward clutch plates 20b between the planetary carrier 17c and the cylinder portion of the forward clutch drum 20a. Further, there is provided with a forward clutch piston 20c for engaging and disengaging the forward clutch plates 20b between the planetary carrier 17c and the forward clutch drum 20a and the rotation center of the forward clutch piston 20c is fitted slidably in the axial direction to the pulley input shaft 3b.

The torque converter case 14 is connected through a damper unit 21 with a lock-up clutch drum 22a of a lock-up clutch 22 and the lock-up clutch drum 22a has a U-shaped portion at the end thereof. The cylinder portion of the forward clutch drum 20a is inserted into the U-shaped portion of the lock-up clutch drum 22a and lock-up clutch plates 22b are provided between the cylinder portion of the forward clutch drum 20a and the U-shaped portion of the lock-up clutch drum 22a. Further, a lock-up clutch piston 20c for engaging and disengaging the lock-up clutch plates 22b is disposed between the forward clutch drum 20a and the forward clutch piston 20c and its rotation center is fitted slidably in the axial direction to the pulley input shaft 3b.

The forward clutch drum 20a, the lock-up clutch piston 22c and the forward clutch piston 20c are arranged in this order in the axial direction. A lock-up operating chamber 22d which acts as a hydraulic pressure chamber for operating the lockup clutch piston 22c is formed between the forward clutch drum 20a and the lock-up clutch piston 22c and a forward clutch operating chamber 20d which acts as a hydraulic pressure chamber for operating the forward clutch piston 20c is formed between the forward clutch piston 20c and the lock-up clutch piston 22c. Therefore, since the lock-up clutch piston 22c itself serves as a partition wall common to the lock-up operating chamber 22d and the forward clutch operating chamber 20d, the number of components can be reduced and the width of the starting apparatus 12 can be shortened.

In this embodiment, as illustrated in FIG. 1, a hydraulic pressure circuit connected to the lock-up operating chamber 22d is formed independently from other hydraulic pressure circuits for cooling and lubricating the torque converter 15. This independent dedicated circuit enables the lock-up clutch piston 22c to be operated by means of a hydraulic pressure supplied from an oil passage (not shown) to the lock-up operating chamber and controlled by a known hydraulic control unit (not shown) and as a result it becomes possible to make a precise control of the working pressure at the changeover operation between the engagement and disengagement of the lock-up clutch. Further, a so-called slip control becomes available at the lock-up control under a low engine speed area, thereby the vibrations and noises of the vehicle body can be reduced.

Further, since the forward clutch plates 20b and the lock-up clutch plates 22b are arranged in a row on the outer periphery side of the planetary carrier 17c, the width of the starting apparatus 12 can be reduced. Further, since the forward clutch plates 20b and the lock-up clutch plates 22b are arranged on the inner periphery side of the cylinder portion of the forward clutch drum 20a, the number of components can be reduced substantially.

On the other hand, a belt 3d is looped over a primary pulley 3a connected with the pulley input shaft 3b and a secondary pulley 3c supporting a pulley output shaft 3e. The pulley output shaft 3e is connected to a differential 23b through a reduction gear set 23a of a final reduction gear unit 23 and the differential 23b is connected to a drive shaft 24 of front or rear wheels.

A primary hydraulic pressure is supplied to a primary oil chamber 3f provided in the primary pulley 3a to determine a groove width of the primary pulley 3a. Further, a secondary hydraulic pressure is supplied to a secondary oil chamber 3g provided in the secondary pulley 3c to apply a tension required for torque transmission to the belt 3d. The primary and secondary hydraulic pressures are established by a transmission control unit (not shown) based on engine operating conditions. Thus, a desired reduction ratio is obtained in reverse proportion to the groove widths of both pulleys 3a, 3c.

Next, a function of thus constituted continuously variable automatic transmission will be described.

When the engine 10 starts, the engine power is transmitted to the pump impeller 15a of the torque converter 15 through the fixed plate 13 connected with the crank shaft 10a and the torque converter case 14. The turbine runner 15b receives the power through the working fluid. The working fluid is returned to the pump impeller 15a after being straightened by the stator 15c.

When the select lever is positioned at "N" (neutral) range or "P" (parking) range, since the brake plates 19b, the forward clutch plates 20b and the lock-up clutch plates 22b, are all released, the planetary gear 17 idles and as a result the power is not transmitted to the continuously variable transmission 3.

When the select lever is positioned at "D" (drive) range, hydraulic pressure is supplied to the forward clutch operating chamber 20d to operate the forward clutch piston 20c. When the forward clutch piston 20c pushes the forward clutch plates 20b to engage the forward clutch 20, the planetary carrier 17c is engaged with the forward clutch drum 20a to transmit the power to the pulley input shaft 3b through the forward clutch drum 20a. Thus, the primary pulley 3a rotates in the forward running direction.

During forward running, when the lock-up operating condition is satisfied, hydraulic pressure is supplied to the lock-up operating chamber 22d to operate the lock-up clutch piston 22c. When the lock-up clutch piston 22c operates so as to engage the lock-up clutch plates 22b with the lock-up clutch drum 22a, the engine power is transmitted to the forward clutch drum 20a which is connected with the pulley input shaft 3a through the fixed plate 13, the torque converter case 14, the damper unit 21 and the lock-up clutch drum 22a. Thus, the power is directly to the primary pulley 3a without going through the torque converter 15, that is, the transmission is in the lock-up condition.

In this case, since the lock-up operating chamber 22d is connected with a dedicated and independent hydraulic circuit, the engagement and disengagement of the lock-up clutch 22 is performed with good responsibility and further, the working pressure can be controlled at a desired value. Therefore, the so-called slip control can be easily realized.

On the other hand, the select lever is positioned at "R" (reverse) range, the hydraulic pressure applied to the forward clutch operating chamber 20d is drained and as a result the forward clutch plates 20b are released. At the same time, the brake plates 19b are engaged by the operation of the brake piston 19c of the reverse brake 19 to fix the ring gear 17b of the planetary gear 17a. Thus, the planetary carrier 17c connected with the turbine runner 15b rotates the planetary pinion 17d so as to rotate the sun gear 17a reversely, thereby the pulley input shaft 3b transmits the reverse rotation to the primary pulley 3a.

In summary, according to the present invention, since the reverse brake, the forward clutch and the lock-up clutch are compactly and integrally assembled around the planetary gear of the forward and reverse changeover apparatus, further, since the forward clutch and the lock-up clutch are arranged in a row, not only the width of the starting apparatus including the torque converter can be shortened, but also the number of components can be reduced.

Further, since the lock-up piston for engaging the lock-up clutch plates and the forward clutch piston for engaging the forward clutch plates are disposed side by side with each other, the hydraulic pressure chambers for operating these pistons can be formed with one partition wall and as a result the construction can be simplified.

Furthermore, according to the present invention, since the hydraulic pressure chamber for operating the lock-up piston is formed independently from other hydraulic circuits, the hydraulic pressure applied to this hydraulic pressure chamber can be precisely controlled by a known hydraulic control unit, thereby the lock-up control can be performed with good responsibility and control performance.

While the presently preferred embodiment of the present invention has been shown and described, it is to be understood that this disclosure is for the purpose of illustration and that various changes and modifications may be made without departing from the scope of the invention as set forth in the appended claim.

What is claimed is:

1. A continuously variable transmission system mounted on a vehicle, comprising:
    a continuously variable transmission;
    an input shaft connected to said continuously variable transmission;
    a torque converter case for accommodating a torque converter;
    a forward and reverse changeover apparatus provided on said input shaft between said torque converter and an engine of the vehicle and accommodated in said torque converter case, said forward and reverse changeover apparatus including a planetary gear provided around said input shaft, a reverse brake provided on an outer periphery of said planetary gear, and a forward clutch provided on an outer periphery of said reverse brake; and
    a lock-up clutch accommodated in said torque converter case.

2. The continuously variable transmission system according to claim 1, wherein
    said forward and reverse changeover apparatus and said lock-up clutch are arranged on approximately the same plane expanded in the radial direction with respect to said input shaft.

3. A continuously variable transmission system mounted on a vehicle, comprising:
    a continuously variable transmission;
    an input shaft connected to said continuously variable transmission;
    a torque converter case for accommodating a torque converter;
    a planetary gear provided on said input shaft for changing over a rotational direction of said input shaft;
    a reverse brake provided on an outer periphery of said planetary gear for rotating said planetary gear inversely;
    a lock-up clutch drum connected with said torque converter case and formed on an inner periphery side of said torque converter case;
    a forward clutch drum connected with said input shaft and provided on an inner periphery side of said lock-up clutch drum;
    a planetary carrier for connecting the torque converter with said planetary gear;
    a forward clutch plate provided between an outer periphery of said planetary carrier and an inner periphery of said forward clutch drum;
    a lock-up clutch plate provided between said lock-up clutch drum and said forward clutch drum;
    a forward clutch piston fitted slidably in an axial direction to said input shaft for operating said forward clutch plate;
    a lock-up piston fitted slidably in the axial direction to said input shaft for operating said lock-up clutch plate;
    a forward clutch operating chamber formed between said forward clutch piston and said lock-up piston for applying hydraulic pressure to said forward clutch piston; and
    a lock-up operating chamber formed between said forward clutch drum and said lock-up piston for applying hydraulic pressure to said lock-up piston.

4. The continuously variable transmission system according to claim 3, wherein
    said lock-up clutch plate and said forward clutch plate are arranged side by side in an axial direction of said forward clutch drum.

5. The continuously variable transmission system according to claim 3, wherein
    said lock-up operating chamber is formed independently from other hydraulic circuits.

6. In a vehicle having an internal combustion engine provided in an engine compartment at a front portion of the vehicle, a frame for absorbing an impact during a collision, a pair of front wheels provided on said frame to steer said vehicle toward a desired direction, a continuously variable transmission system, a crankshaft protruded from said engine for transmitting a torque to said continuously variable transmission system, and an input shaft protruded from the continuously variable transmission system for receiving said torque, the continuously variable transmission system comprising:
    a continuously variable transmission;
    a torque converter coaxially and mechanically mounted on said input shaft between said engine and said continuously variable transmission for varying a torque ratio therebetween;
    said torque converter including an impeller permanently connected to said crankshaft via a torque converter casing for rotating a hydraulic fluid therein and a turbine runner coaxially and mechanically connected to said input shaft for being rotated by said hydraulic fluid;
    a lock-up clutch provided in said torque converter casing for establishing a lock-up condition if required for said vehicle to forwardly run;
    a planetary gear coaxially and rotatably mounted on said input shaft and included in said lock-up clutch for changing a rotating direction of said input shaft;
    a forward clutch interposed between said lock-up clutch and said planetary gear in a radial direction, wherein said forward clutch engages to rotate said input shaft so as to move said vehicle in a forward direction and disengages when said vehicle moves in a reverse direction; and
    a reverse brake interposed between said forward clutch and said planetary gear in said radial direction, wherein said reverse brake engages to rotate said input shaft so as to move said vehicle in said reverse direction and disengages when said vehicle moves in said forward direction.

7. A continuously variable transmission system mounted on a vehicle, comprising:
    a continuously variable transmission;
    an input shaft connected to said continuously variable transmission and extending in an axial direction;
    a torque converter case for accommodating a torque converter;

a forward and reverse changeover apparatus provided on said input shaft between the torque converter and an engine of the vehicle and accommodated in said torque converter case;

a forward clutch provided on an outer periphery of said forward and reverse changeover apparatus; and a lock-up clutch provided on the outer periphery of said forward and reverse changeover apparatus, said lock-up clutch arranged side by side with said forward clutch in the axial direction and accommodated in said torque converter case.

8. A continuously variable transmission system mounted on a vehicle, comprising:

a continuously variable transmission;

an input shaft connected to said continuously variable transmission;

a torque converter case for accommodating a torque converter;

a forward and reverse changeover apparatus provided on said input shaft between the torque converter and an engine of the vehicle and accommodated in said torque converter case, wherein said forward and reverse changeover apparatus includes a planetary gear provided around said input shaft, a reverse brake provided on an outer periphery of said planetary gear, and a forward clutch provided on an outer periphery of said reverse brake; and a lock-up clutch provided on the outer periphery of said reverse brake, side by side with said forward clutch, wherein said lock-up clutch is provided around said forward and reverse changeover apparatus and accommodated in said torque converter case.

9. A continuously variable transmission system for mounting on a vehicle, comprising:

a continuously variable transmission;

an input shaft connected to said continuously variable transmission;

a torque converter case for accommodating a torque converter;

a forward and reverse changeover apparatus provided on said input shaft between the torque converter and an engine of the vehicle and accommodated in said torque converter case, the forward and reverse changeover apparatus including a planetary gear provided around said input shaft, a reverse brake provided on an outer periphery of said planetary gear, and a forward clutch provided on an outer periphery of said reverse brake; and a lock-up clutch accommodated in said torque converter case.

10. A continuously variable transmission system for mounting on a vehicle, comprising:

a continuously variable transmission;

an input shaft connected to said continuously variable transmission and extending in an axial direction;

a torque converter case for accommodating a torque converter;

a forward and reverse changeover apparatus provided on said input shaft between the torque converter and an engine of the vehicle and accommodated in said torque converter case;

a forward clutch provided on an outer periphery of said forward and reverse changeover apparatus; and a lock-up clutch provided on the outer periphery of said forward and reverse changeover apparatus, said lock-up clutch arranged side by side with said forward clutch in the axial direction and accommodated in said torque converter case.

* * * * *